United States Patent
Qin

(10) Patent No.: US 9,900,195 B2
(45) Date of Patent: Feb. 20, 2018

(54) METHOD TO DEMODULATE A SIGNAL COMPONENT FROM A SAMPLED INPUT SIGNAL AND FIELD BUS DEVICE

(71) Applicant: ABB TECHNOLOGY AG, Zurich (CH)

(72) Inventor: Yi Qin, Minden (DE)

(73) Assignee: ABB TECHNOLOGY AG, Zurich (CH)

(*) Notice: Subject to any disclaimer, the term of this patent is extended or adjusted under 35 U.S.C. 154(b) by 0 days.

(21) Appl. No.: 15/172,167

(22) Filed: Jun. 3, 2016

(65) Prior Publication Data

US 2016/0359650 A1 Dec. 8, 2016

(30) Foreign Application Priority Data

Jun. 3, 2015 (EP) ..................................... 15170532

(51) Int. Cl.
*H03D 3/00* (2006.01)
*H04L 27/14* (2006.01)
(Continued)

(52) U.S. Cl.
CPC ........ *H04L 27/1566* (2013.01); *H04L 27/144* (2013.01)

(58) Field of Classification Search
CPC ......... H04L 27/10; H04L 27/02; H04L 27/14; H04L 25/4902; H04L 27/26; H04L 27/30;
(Continued)

(56) References Cited

U.S. PATENT DOCUMENTS 5,325,427 A * 6/1994 Dighe ..................... H04L 27/30
379/283
5,477,465 A * 12/1995 Zheng ..................... H04Q 1/46
702/76

(Continued)

*Primary Examiner* — James M Perez
(74) *Attorney, Agent, or Firm* — Leydig, Voigt & Mayer, Ltd.

(57) ABSTRACT

A method to determine the magnitude $M_A$ of a signal component with frequency $\omega_A$ from a set of N digital samples of an input signal acquired at a sampling rate R, said input signal having a discrete spectral representation having n bins with frequencies $\omega_1, \ldots, \omega_n$ and corresponding magnitudes $M_1, \ldots, M_n$, the spectral representation being derivable from the input signal using a transform, involving choosing an extraction bin with index $k \in [1, \ldots, n]$ and frequency $\omega_k \neq \omega_A$ from the spectral representation; determining a magnitude $M_k$ of this extraction bin; determining an allocation factor indicating a portion $M_{ks}$ of a sinusoidal signal with frequency $\omega_A$ and unity magnitude that is allocated to the extraction bin when the transform is applied to the sinusoidal signal to generate a spectral representation out of the sinusoidal signal; and determining the magnitude $M_A$ of the signal component from the magnitude $M_k$ of the bin in combination with the factor.

18 Claims, 2 Drawing Sheets

(51) Int. Cl.
*H04L 27/156* (2006.01)
*H04L 27/144* (2006.01)

(58) Field of Classification Search
CPC ......... H04L 1/04; H04L 5/02; H04L 27/1563;
H04L 27/1525; H04L 27/142; H04L
27/144; A61B 5/0002; A61B 5/0006;
A61B 5/0015; H03D 3/007; H04Q 1/46;
G01S 7/352
USPC .................. 375/130–136, 259–285, 316–352
See application file for complete search history.

(56) References Cited

U.S. PATENT DOCUMENTS

| | | | | |
|---|---|---|---|---|
| 5,729,577 A * | 3/1998 | Chen | ...................... | H04L 7/027 329/300 |
| 5,809,133 A * | 9/1998 | Bartkowiak | ............ | H04L 27/30 379/282 |
| 5,818,296 A * | 10/1998 | Lee | ...................... | H04L 27/148 329/300 |
| 5,852,638 A * | 12/1998 | Chen | ...................... | H04L 27/144 329/300 |
| 6,005,477 A * | 12/1999 | Deck | ...................... | H04B 3/542 340/12.33 |
| 6,047,033 A * | 4/2000 | Chen | ...................... | H04L 7/027 375/326 |
| 6,381,330 B1 * | 4/2002 | Johanson | ................ | H04M 3/22 379/282 |
| 6,674,855 B1 * | 1/2004 | Karelic | ................ | H04M 3/005 379/283 |
| 6,711,540 B1 * | 3/2004 | Bartkowiak | ............ | G10L 25/78 704/226 |
| 7,639,734 B2 * | 12/2009 | Page | ....................... | H04L 27/12 375/151 |
| 9,276,789 B2 * | 3/2016 | Pook | ...................... | H04L 27/148 |
| 9,379,654 B2 * | 6/2016 | Peretti | ..................... | H02P 21/14 |
| 2003/0123574 A1 * | 7/2003 | Simeon | ............... | H04L 25/4927 375/340 |
| 2003/0123647 A1 * | 7/2003 | Itoh | ........................ | H04Q 1/46 379/399.01 |
| 2004/0190663 A1 * | 9/2004 | Carsello | .................. | H04L 7/042 375/354 |
| 2006/0055587 A1 * | 3/2006 | Mitsumoto | ............ | G01S 7/352 342/70 |
| 2007/0247324 A1 * | 10/2007 | Benninger | .............. | H04L 27/30 340/12.32 |
| 2009/0204357 A1 * | 8/2009 | Kurosawa | ............ | G06F 1/0342 702/124 |
| 2010/0027687 A1 * | 2/2010 | De Natale | ............ | H02H 1/0076 375/259 |
| 2012/0164966 A1 * | 6/2012 | Casagrande | ............ | H04L 27/14 455/318 |
| 2012/0320995 A1 * | 12/2012 | Dabak | ...................... | H04B 3/54 375/257 |
| 2013/0028306 A1 * | 1/2013 | Seibert | ................ | H04L 27/0012 375/224 |
| 2014/0192933 A1 * | 7/2014 | Pook | ..................... | H04L 27/148 375/324 |
| 2015/0146806 A1 * | 5/2015 | Terry | .................. | H04L 25/0204 375/260 |
| 2016/0220128 A1 * | 8/2016 | Den Brinker | ........ | A61B 5/7203 |

\* cited by examiner

METHOD TO DEMODULATE A SIGNAL COMPONENT FROM A SAMPLED INPUT SIGNAL AND FIELD BUS DEVICE

CROSS-REFERENCE TO RELATED APPLICATIONS

Priority is claimed to European Patent Application No. 15 170 532.4, filed on Jun. 3, 2015, the entire disclosure of which is hereby incorporated by reference herein.

FIELD

The invention relates to the demodulation of signals with particular frequencies of interest from an input signal that is digitally sampled at a fixed sampling rate. The invention also relates to a field bus device that incorporates this demodulation.

BACKGROUND

A Highway Addressable Remote Transducer (HART) field bus system transmits data between devices connected to the field bus using frequency shift keyed (FSK) signals. According to the HART standard, a frequency of 1200 Hz represents bit 1, and a frequency of 2200 Hz represents bit 0. This FSK signal may additionally be superimposed onto an analog sensor signal if an existing line that carries such a signal is used as the physical medium for the field bus.

There is therefore a need to know at any time whether a given input signal contains a component modulated at 1200 HZ or whether it contains a component modulated at 2200 Hz. This is done by acquiring a set of digital samples of the input signal over a time interval and checking a spectral representation of this set of samples for the presence of 1200 Hz and 2200 Hz components.

The computing power available in each individual device on the field bus for this purpose is very modest, since the microcontroller unit (MCU) of the device plays a major role in terms of manufacturing cost and power consumption. Therefore, the frequency spectrum of the input signal is windowed into only a few discrete bins corresponding to frequencies that are integer multiples of a base frequency. This base frequency is typically 1200 Hz, so the corresponding magnitude can be extracted individually very easily without computing the magnitude of all bins of the spectrum. However, the magnitude of a signal modulated at 2200 Hz is not readily available. An approximation of this magnitude can be calculated using the Goertzel algorithm, but this is computationally expensive.

SUMMARY

An aspect of the invention provides a method to determine the magnitude $M_A$ of a signal component with frequency $\omega_A$ from a set of N digital samples of an input signal acquired at a sampling rate R, the input signal having a discrete spectral representation containing n bins with frequencies $\omega_1, \ldots, \omega_n$ and corresponding magnitudes $M_1, \ldots, M_n$, the spectral representation being derivable from the input signal using of a transform, the method comprising: choosing an extraction bin with index $k \in [1, \ldots, n]$ and frequency $\omega_k \neq \omega_A$ is chosen from the discrete spectral representation; determining a magnitude $M_k$ of this extraction bin; determining an allocation factor, the allocation factor indicating a portion $M_{ks}$ of a sinusoidal signal with frequency $\omega_A$ and unity magnitude that is allocated to the extraction bin when the transform is applied to the sinusoidal signal, thereby generating a spectral representation out of the sinusoidal signal; and determining the magnitude $M_A$ of the signal component from the magnitude $M_k$ of the extraction bin in combination with the allocation factor.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
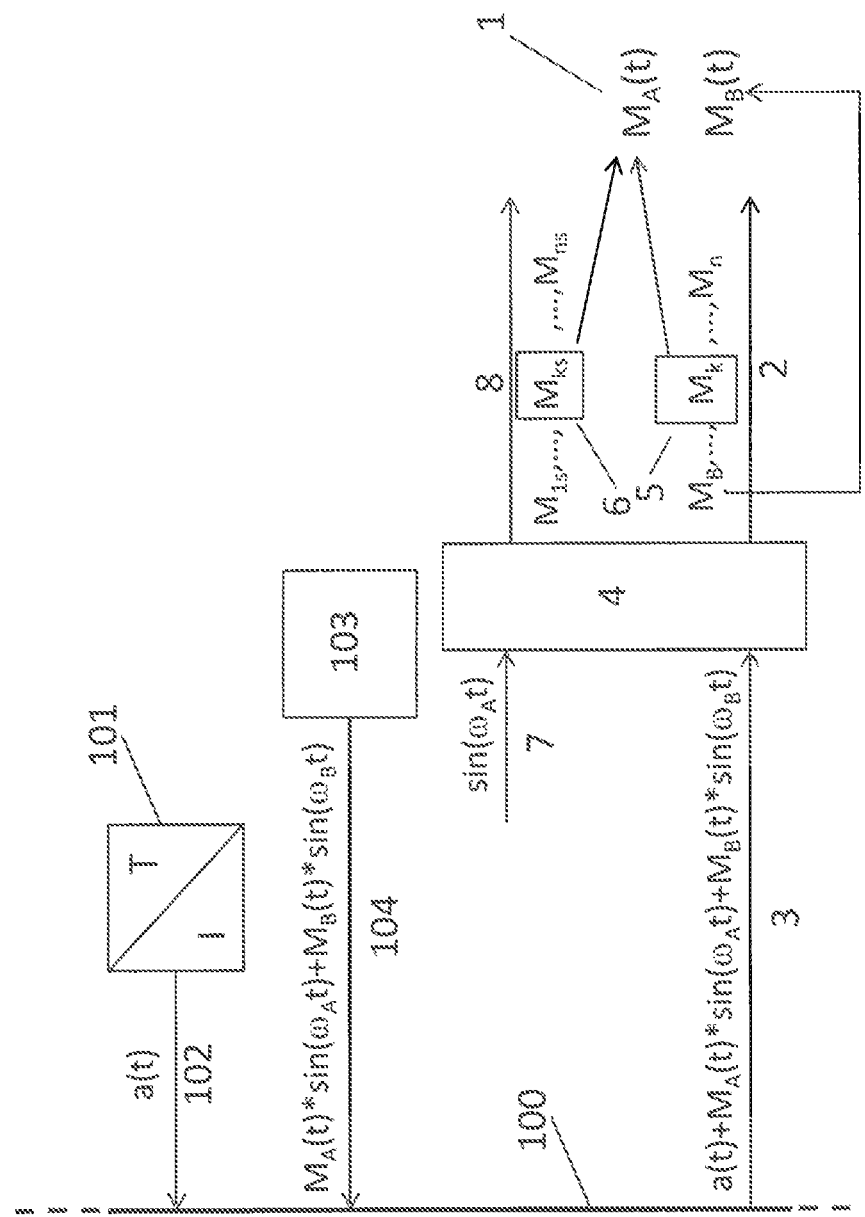
FIG. 1 shows an embodiment of the method according to the invention in an industrial setting.

An aspect of the present invention reduces the computational expense discussed in the Background, while at the same time improving the accuracy of the determined magnitude value.

The inventor has developed a method to determine the magnitude $M_A$ of a signal component with frequency $\omega_A$ from a set of N digital samples of an input signal acquired at a sampling rate R. This input signal has a discrete spectral representation containing n bins with frequencies $\omega_1, \ldots, \omega_n$ and corresponding magnitudes $M_1, \ldots, M_n$. The spectral representation is derivable from said input signal, preferably from the set of N digital samples of this input signal, by means of a transform. The transform is preferably chosen to produce a discrete spectral representation wherein the first bin frequency $\omega_1$ is zero and the second and following bin frequencies $\omega_2, \ldots, \omega_n$ are integer multiples of the first non-zero bin frequency $\omega_2$. It may, for example, be a discrete Fourier transform.

To obtain the magnitude $M_A$ of the signal component that is present during a predetermined time interval, it is not necessary to perform the transform on all samples of the input signal acquired within that time interval and obtain the full spectral representation. Rather, the magnitude $M_A$ is extracted from that set of samples at a lesser computational expense.

According to the invention, an extraction bin with index $k \in [1, \ldots, n]$ and frequency $\omega_k \neq \omega_A$ is chosen from the spectral representation, and the magnitude $M_k$ of this extraction bin is determined. It is then determined which portion of a sinusoidal signal with frequency $\omega_A$ and unity magnitude is allocated to this extraction bin when the transform is applied to said sinusoidal signal, i.e., when the sinusoidal signal is transformed into a spectral representation in exactly the same way as the actual input signal. This portion is called allocation factor. From the combination of this allocation factor and the magnitude $M_k$ of the extraction bin, the desired magnitude $M_A$ of the component with frequency $\omega_A$ is determined.

The inventor has found that it is very much easier to obtain magnitudes $M_1, \ldots, M_n$ corresponding to bin frequencies $\omega_1, \ldots, \omega_n$ than to directly obtain a magnitude $M_A$ corresponding to an off-bin frequency $\omega_A$. This difference is so large that it over-compensates the additional expense of determining the allocation factor and using this allocation factor to get from the magnitude $M_k$ of the extraction bin to the desired magnitude $M_A$.

The allocation factor depends on the sampling rate R, the number N of digital samples in the set, the type of transform, the number n and the frequencies $\omega_1, \ldots, \omega_n$ of the bins, the index k of the extraction bin, and the frequency $\omega_A$. All of these parameters may be kept constant during operation of a field bus device. Therefore, the allocation factor needs to be determined only once in such a setting. It may, for example, be computed when the device is initialized at power-up with its operating parameters. It may also be pre-stored in the device, for example, in a lookup table.

Thus, determination of the desired magnitude $M_A$ according to invention, which may appear to be circuitous at first sight, reduces the amount of computing power needed to determine $M_A$. For an interval of N=6 samples, previously, direct determination of $M_A$ using the Goertzel algorithm for approximation required 11 add steps and 9 multiply steps. Determination of $M_A$ according to the invention only requires 5 add steps and 3 multiply steps. In addition, the solution is more accurate. As a consequence, a field bus device can demodulate FSK-encoded data with a smaller, less expensive microcontroller unit (MCU) that needs less power to run.

In a specially advantageous embodiment of the invention, the input signal is a frequency shift keyed signal with a first carrier frequency equal to $\omega_A$ and at least a second carrier frequency $\omega_B$. Preferably, this second carrier frequency $\omega_B$ is one of the frequencies $\omega_1, \ldots, \omega_n$ in the discrete spectral representation, with corresponding magnitude $M_B$. This magnitude $M_B$ is then readily available from the set of digital samples of the input signal, requiring only a very simple computation, such as a simple case of the Goertzel algorithm or an iterative discrete Fourier transform (DFT) algorithm.

One of the carrier frequencies $\omega_A$ and $\omega_B$ encodes a logical 0, while the other carrier frequency encodes a logical 1. By acquiring N samples and subsequently determining the magnitudes $M_A$ and $M_B$ of components with the carrier frequencies $\omega_A$ and $\omega_B$ from this set of samples, the bit value of the FSK-encoded signal during the period of N samples can therefore be obtained.

Preferably, the second carrier frequency $\omega_B$ is not an integer multiple of the first carrier frequency $\omega_A$. This typically precludes $\omega_A$ from being one of the frequencies $\omega_1, \ldots, \omega_n$ in the discrete spectral representation, but avoids a cross-talk from harmonics of one carrier frequency onto the other carrier frequency.

The input signal may additionally contain at least one analog signal representing a value measured by at least one sensor. For example, a FSK signal for field bus communication may be superimposed on an analog current loop signal on legacy 4-20 mA wiring that represents a value measured by a sensor. In such a setting, a field bus may be rolled out without rewiring. In a specially advantageous embodiment of the invention, the field bus signal may conform to the wired or wireless Highway Addressable Remote Transducer (HART) standard. This is an open standard that is part of the IEC 61158 field bus specification.

In a specially advantageous embodiment of the invention, the transform is chosen to produce a discrete spectral representation wherein the first bin frequency $\omega 1$ is zero and the second and following non-zero bin frequencies $\omega_3, \ldots, \omega_n$ are integer multiples of the first bin non-zero bin frequency $\omega_2$. The set of samples and its spectral representation may, for example, be interrelated via a discrete Fourier transform. The first non-zero bin frequency $\omega_2$ may, for example, be given by $\omega_2 = R/N$. $\omega_2$ is then the lowest frequency for which one complete period can be covered by acquisition of N samples at a rate of R samples per second. An interval of N samples will therefore also contain only complete periods of all other frequencies $\omega_3, \ldots, \omega_n$ as well, so that the magnitudes $M_1, \ldots, M_n$ corresponding to all frequencies $\omega_1, \ldots, \omega_n$ can be determined without any fencing and leakage effects. Such effects occur if a finite sampling interval contains incomplete periods of the frequency of the component that is to be demodulated.

Preferably, the first non-zero bin frequency $\omega_2$ corresponds to the second carrier frequency $\omega_B$. Since the carrier frequencies $\omega_A$ and $\omega_B$ are usually fixed by the field bus communication standard that is in use, this may mean adapting the sampling rate R and the number N of acquired samples in order to set $\omega_2$ to the value of $\omega_B$. Likewise, these parameters also determine $\omega_3$, which is preferably close to the first carrier frequency $\omega_A$.

In a specially advantageous embodiment of the invention, the magnitude $M_k$ of the extraction bin, and/or the magnitude $M_B$ corresponding to the second carrier frequency $\omega_B$, is determined individually from a set of input signal samples. This carries a far lesser computational expense than computing all $M_1, \ldots, M_n$. The magnitude $M_k$, and/or the magnitude $M_B$, may, for example, be determined from the set of input signal samples by means of (iterative) discrete Fourier transform and/or by means of the Goertzel algorithm.

In a further specially advantageous embodiment of the invention, the magnitude $M_k$ of the extraction bin is augmented by a magnitude $M_M$ corresponding to a frequency $\omega_M$ that is a mirror frequency of the frequency $\omega_k$ of the extraction bin about the frequency R/2. According to the fundamental Nyquist-Shannon sampling theorem, a signal sampled at sampling rate R only contains the required information to reconstruct frequency components with a frequency of at most R/2. Frequencies above R/2 constitute the virtual part of the spectrum with the frequencies that cannot be uniquely reconstructed. Application of the transform to the sinusoidal signal with frequency $\omega_A$, however, allocates portions of this sinusoidal signal to all bins of the spectral representation, including those with frequencies above R/2. To conserve the total power of the sinusoidal signal, those portions are re-allocated to their mirror frequencies below R/2.

The invention also relates to a device for use on a field bus that is controlled and/or managed by means of a FSK-encoded digital data stream sent over the field bus. In this data stream, one bit value is encoded by a first carrier frequency $\omega_A$ and the other bit value is encoded by a second carrier frequency $\omega_B$. The device has means to acquire a set of N digital samples of an input signal from the field bus at a sampling rate R, and it is configured to determine the magnitude $M_B$ that a frequency component with frequency $\omega_B$ has in a discrete spectral representation of the input signal containing n bins with frequencies $\omega_1, \ldots, \omega_n$ and corresponding magnitudes $M_1, \ldots, M_n$. One of the bin frequencies $\omega_1, \ldots, \omega_n$ corresponds to the second carrier frequency $\omega_B$. The spectral representation is derivable from the input signal by means of a transform. The device is also configured to determine the magnitude $M_A$ that a frequency component with frequency $\omega_A$ has in the discrete spectral representation of the input signal.

According to the invention, the device is configured to determine the magnitude $M_k$ of a bin frequency component $\omega_k \neq \omega_A$ with index $k \in [1, \ldots, n]$, and to determine $M_A$ from $M_k$ in combination with an allocation factor that indicates a portion $M_{ks}$ of a sinusoidal signal with frequency $\omega_A$ and unity magnitude that is allocated to the bin with index k when the transform is applied to said sinusoidal signal to generate a spectral representation out of said sinusoidal signal.

As mentioned above in the description of the method, which is herewith incorporated in its entirety as corresponding disclosure of the device, this determination of $M_A$ requires far less computing power in the microcontroller unit of the device.

The device may comprise means to perform the transform on a sinusoidal signal with frequency $\omega_A$ in order to obtain $M_{ks}$, and/or to individually obtain $M_{ks}$ from a set of N digital samples of said sinusoidal signal. Alternatively or in combination with this, the device may comprise a memory containing at least one pre-stored value of $M_{ks}$. Preferably, this memory contains a lookup table with a plurality of pre-stored values of $M_{ks}$ for different combinations of sampling rate R and number N of acquired digital samples.

FIG. 1 shows an embodiment of the method according to the invention in an industrial setting where an analog temperature sensor 101 and a digital sensor/actuator device 103 are both connected to a field bus 100 with a 4-20 mA current loop wiring as the physical medium. The analog temperature sensor 101 converts a temperature T into a current I between 4 mA and 20 mA and outputs a corresponding signal 102 onto the field bus 100. This signal 102 is a slowly varying function a(t) of the time t.

The digital sensor/actuator device 103 sends a frequency shift keying (FSK)-encoded data signal 104 onto the field bus 100. The data signal 104 conforms to the HART standard. To send a logical 1, the signal 104 is keyed to a frequency $\omega_B$ of 1200 Hz. To send a logical 0, the signal 104 is keyed to a frequency $\omega_A$ of 2200 Hz. Thus, the data signal 104 consists of one component $M_A(t)*\sin(\omega_A t)$, the magnitude $M_A(t)$ being unity when a 0 is being sent and zero otherwise, and one component $M_B(t)*\sin(\omega_B t)$, the magnitude $M_B(t)$ being unity when a 1 is being sent and zero otherwise. Both components and the analog signal 102 mix on the field bus 100 to form an input signal 3 for the demodulation.

The device 103 communicates bidirectionally with the field bus 100. It is also equipped to receive an input signal 3 from the field bus 100 and to determine the bit value of a FSK-encoded data signal 104 contained in this input signal 3 by determining the magnitudes of frequency components with the carrier frequencies $\omega_A$ and $\omega_B$. This is done by means of the method illustrated below in more detail.

This input signal 3 is sampled at a sampling rate R of 7200 Hz. The input signal 3 is deemed to have a spectral representation 2 containing n=6 bins with frequencies $\omega_1=0$, $\omega_2=\omega_B=1200$ Hz, $\omega_3=2400$ Hz, $\omega_4=3600$ Hz, $\omega_5=4800$ Hz and $\omega_6=6000$ Hz. These bins have corresponding magnitudes $M_1$, $M_2=M_B$, $M_3$, $M_4$, $M_5$ and $M_n=M_6$. The third bin is chosen to be the extraction bin 5, so the extraction bin 5 has frequency $\omega_k=\omega_3$ and magnitude $M_k=M_3$. After N=6 samples have been acquired, the magnitudes $M_B=M_2$ and $M_k=M_3$ are extracted by means of the Goertzel algorithm without computing the other magnitudes $M_1$, $M_4$, $M_5$ and $M_6$ as well. $M_B$ is immediately usable as the final result $M_B(t)$ that is a time-varying function discretized into time intervals N/R=1/1200 s.

The spectral representation 2 is interrelated with the input signal 3 through a discrete Fourier transform 4. On initialization of the method, this discrete Fourier transform 4 is performed once on a sinusoidal signal 7 with frequency $\omega_A=2200$ Hz. Since this frequency does not match any of the bin frequencies $\omega_1$ to $\omega_6$, the unity magnitude of the sinusoidal 7 is smeared over all six bins by the discrete Fourier transform 4 with magnitudes $M_{1s}, \ldots, M_{ns}=M_{6s}$ as shown in the following table:

| $\omega$ | 0 Hz | 1200 Hz | 2400 Hz | 3600 Hz | 4800 Hz | 6000 Hz |
|---|---|---|---|---|---|---|
| M | 0.01 | 0.03888 | 0.9142 | 0.021 | 0.00845 | 0.00699 |

The frequencies 4800 Hz and 6000 Hz are higher than R/2=3600 Hz. According to the Shannon-Nyquist theorem, components with these frequencies cannot be uniquely recovered from samples acquired at a rate of R=7200 Hz. To conserve the total unity magnitude of the sinusoidal 7, the magnitude $M_3$ for $\omega_3=2400$ Hz is augmented by the magnitude $M_5$ for $\omega_5=4800$ Hz. Likewise, the magnitude $M_2$ for $\omega_2=1200$ Hz is augmented by the magnitude $M_6$ for $\omega_5=6000$ Hz. $\omega_5=4800$ Hz is the mirror frequency of $\omega_3=2400$ Hz, and $\omega_6=6000$ Hz is the mirror frequency of $\omega_2=1200$ Hz, when mirrored about the frequency $\omega_4$=R/2=3600 Hz. The following table shows the final result for the magnitudes $M_{1s}$, $M_{2s}$ and $M_{3s}$ produced by the discrete Fourier transform 4 from the sinusoidal signal 7:

| | $\omega$ | | |
|---|---|---|---|
| 0 Hz | 1200 Hz | 2400 Hz | 3600 Hz |
| M 0.01 | 0.0458 | 0.9226 | 0.021 |

The magnitude $M_{ks}$ corresponding to the frequency $\omega_k=\omega_3=2400$ Hz is extracted from the resulting spectral representation 8 and stored as allocation factor 6. This allocation factor will be used for all N=6-sample periods that follow.

Since the second signal component with frequency $\omega_B$ is on the bin frequency $\omega_2=1200$ Hz, it is not smeared to any other bins. The only source where the signal at frequency $\omega_k=\omega_3=2400$ Hz can have originated is therefore the signal with frequency $\omega_A=2200$ Hz that has been smeared. Therefore, $M_A(t)=M_k(t)/M_{ks}=M_3/0.9226$.

$M_A(t)$ is again a time-varying function discretized into time intervals N/R=1/1200 s. Since the N=6 samples interval contains only part of one period of a 2200 Hz signal, there is some power leakage that results in random-like fluctuations of $M_A(t)$. These fluctuations can be reduced by averaging over a sufficient number of N=6-sample intervals; the expected value matches the real magnitude much better than the previous direct approximation from the sampled input signal 3 using the Goertzel algorithm.

With $M_A(t)$ and $M_B(t)$ now finally in hand, the bit value of the input signal 3 can be determined for each N=6-sample interval, so the FSK-encoded data stream can be demodulated from the input signal 3.

The smearing of the sinusoidal signal 7 to the six bins of its spectral representation 8 can be calculated as follows: In the absence of a concrete specification for the windowing of the sinusoidal signal 7, the stream of samples x(k) can be assumed to be divided into rectangular windows containing N samples each:

$$x_N(k)=x(k) \cdot R_N(k),$$

wherein $R_N(k)$ is 1 if the index k is within the window, and 0 otherwise. According to the convolution theorem, the spectral representation of this is $$X_N(\omega) = \frac{1}{2\pi} X(\omega) \cdot R_N(\omega),$$

wherein $X(\omega)$ is the spectral representation of the signal $x(k)$ (a delta-function peak at one single frequency for a sinusoidal signal 7), and $R_N(\omega)$ is the Fourier transform of the rectangular function. This Fourier transform is given by $$R_N(\omega) = \sum_{k=-\infty}^{\infty} R_N(k)\exp(-i\omega k)$$

$$= \sum_{k=0}^{N-1} R_N(k)\exp(-i\omega k)$$

$$= \frac{1-\exp(-i\omega N)}{1-\exp(-i\omega)}$$

$$= \frac{\exp(-iN\omega/2)(\exp(iN\omega/2)-\exp(-iN\omega/2))}{\exp(-i\omega/2)(\exp(i\omega/2)-\exp(-i\omega/2))}$$

$$= \exp(-i(N-1)\omega/2)\frac{\sin(N\omega/2)}{\sin(\omega/2)}$$

Therefore, $$X_N(\omega_0) = \frac{1}{2\pi} \int_{+\infty}^{-\infty} X(\omega)\exp(-i(N-1)(\omega_0-\omega)/2)\frac{\sin(N(\omega_0-\omega)/2)}{\sin((\omega_0-\omega)/2)} d\omega$$

wherein $\omega_0$ is the frequency corresponding to the bin under discussion. The factor $$\alpha = \frac{1}{N} \cdot \frac{\sin(N(\omega_0-\omega)/2)}{\sin((\omega_0-\omega)/2)}$$

is called Dirichlet kernel.

If the signal is wholly concentrated on the bin frequency $\omega_0$, i.e. $\omega = \omega_0$, then $\alpha = 1$, i.e. 100% of the magnitude of such a sinusoidal signal is distributed into this one bin.

Throughout this calculation, $\omega$ is a normalized angular frequency and given in terms of frequency f by $$\omega(f) = \frac{2\pi(f_i - f)}{R},$$

wherein $f_i$ is the frequency of interest (i.e., the frequency of the component whose magnitude is to be determined) and R is the sampling rate.

Figure 2:
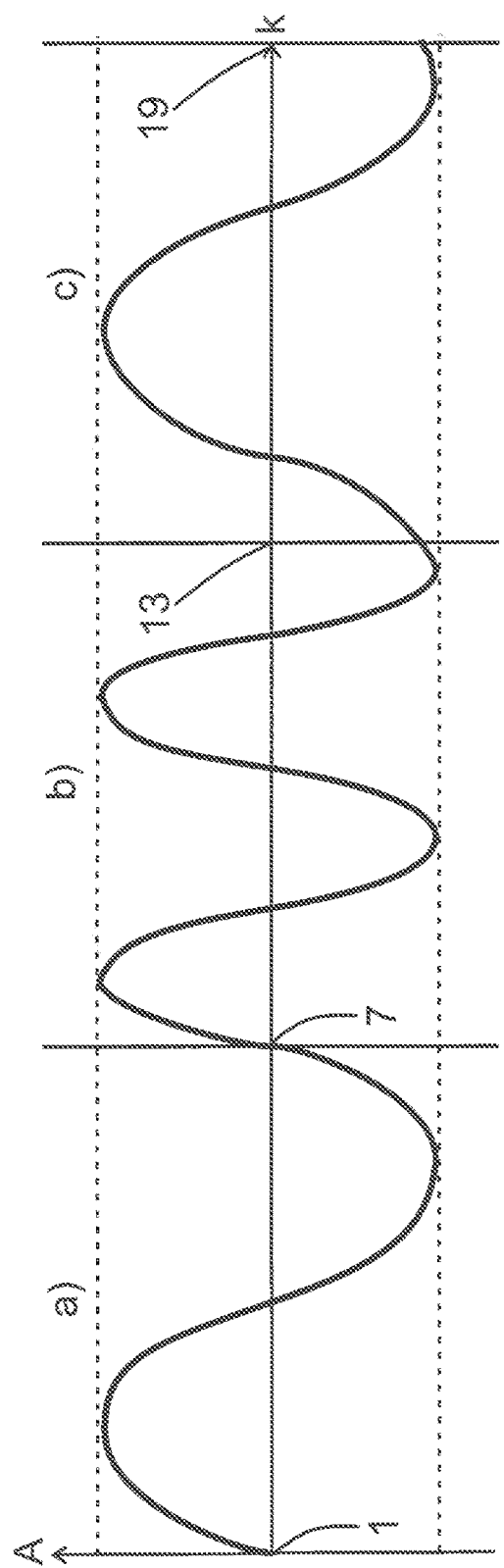
FIG. 2 shows an example for a FSK-encoded data signal on a HART field bus.

FIG. 2 shows an example of a data signal 104 emitted by a digital sensor/actuator device 103. The amplitude A of the signal is sketched over the sample number k. There are three distinct intervals a), b) and c), each lasting $\frac{1}{1200}^{th}$ of a second. Interval a), which starts with sample 1, comprises one period of a frequency $\omega_B = 1200$ Hz; a logical 1 is being sent. At the beginning of interval b) (sample 7), the device switches to sending a logical 0. The frequency of the signal increases to $\omega_A = 2200$ Hz. Interval b) comprises one complete period of this frequency and the better part of a second period. This second period, however, is cut off at sample 13, which marks the beginning of interval c). The device switches again to sending a logical 1, which corresponds to a frequency $\omega_B = 1200$ Hz. Consequently, interval c) contains exactly one period of this frequency.

In the following, it is illustrated how the method according to the invention saves computation time compared with the previous direct determination of $M_A$ from the acquired samples of the input signal 3 via the Goertzel algorithm. According to the Goertzel algorithm, if $f_i$ is the frequency of interest, the corresponding magnitude $M(f_i)$ in the spectral representation 2 of the input signal 3 is given by $$\begin{cases} S_{N-1} = X_{N-1} \\ S_{N-2} = X_{N-2} + Coe \cdot S_{N-1} \\ S_{N-3} = X_{N-3} + Coe \cdot S_{N-2} - S_{N-1} \\ S_{N-4} = X_{N-4} + Coe \cdot S_{N-3} - S_{N-2} \\ \Lambda \\ S_0 = X_0 + Coe \cdot S_1 - S_2 \end{cases}$$

$$M(f_i) = S_0 \cdot S_0 + S_1 \cdot S_1 - Coe \cdot S_0 \cdot S_1$$

$$Coe = 2 \cdot \cos\left(2\pi \frac{f_i}{R}\right)$$

wherein the $X_k$ are individual acquired samples.

In the embodiment shown in FIG. 1, 9 multiply operations and 11 add operations are required to calculate $M(2200$ Hz$)=M_A$. This is a heavy burden for the low performance processors typically incorporated in field bus devices.

For $f_i = 2400$ Hz and R=7200 Hz, however, Coe becomes −1, so that most terms cancel out and only $S_0$ and $S_1$ need to be computed:

$$\begin{cases} S_0 = X_0 - X_1 + X_3 - X_4 \\ S_1 = X_1 - X_2 + X_4 - X_5 \end{cases}$$

In addition, $S_0$ can be re-used for the next round calculation as $S_1$. The computation simplifies to 5 add steps and 2 multiply steps. Division of $M(2400$ Hz$)$ by the constant allocation factor 6 ($M_{ks}$) is only one additional multiply step. So only a total of 3 multiply steps and 5 add steps is required. Considering that multiply steps are computationally much more expensive than add steps, the savings become even more drastic.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE SIGNS 1 signal component with frequency $\omega_A$
2 spectral representation of input signal 3
3 input signal
4 transform interrelating input signal 3 & spectral representation 2
5 extraction bin of spectral representation 2
6 allocation factor
7 sinusoidal signal with frequency $\omega_A$
8 spectral representation of sinusoidal signal 7 after transform 4
100 field bus
101 temperature sensor
102 analog signal from temperature sensor 101
103 digital sensor/actuator device
104 FSK data signal from sensor/actuator device 103
A amplitude
a(t) analog signal 102
I current
k index
$M_A$, $M_B$ magnitudes of first and second signal components
$M_1$-$M_n$ magnitudes in spectral representation 2 of input signal 3
$M_{1s}$-$M_{ns}$ magnitudes in spectral representation 8 of sinusoidal signal 7
T temperature
t time
$\omega_A$, $\omega_B$ frequencies of first and second signal components

The invention claimed is:

1. A method to determine the magnitude $M_A$ of a signal component with frequency $\omega_A$ from a set of N digital samples of an input signal acquired at a sampling rate R, the input signal having a discrete spectral representation containing n bins with frequencies $\omega_1, \ldots, \omega_n$ and corresponding magnitudes $M_1, \ldots, M_n$, the spectral representation being derivable from the input signal using a transform, the method comprising:
choosing an extraction bin with index k∈[1, . . . , n] and frequency $\omega_k \neq \omega_A$ from the discrete spectral representation;
determining a magnitude $M_k$ of this extraction bin;
determining an allocation factor, the allocation factor indicating a portion $M_{ks}$ resulting from a reference sinusoidal signal with frequency $\omega_A$ and unity magnitude, that is allocated to the extraction bin when the transform is applied to the reference sinusoidal signal, thereby generating a spectral representation out of the sinusoidal signal; and
determining the magnitude $M_A$ of the signal component from the magnitude $M_k$ of the extraction bin in combination with the allocation factor, the magnitude $M_A$ being equal to the magnitude of the extraction bin $M_k$ divided by the portion $M_{ks}$ of the sinusoidal signal with frequency $\omega_A$ ($M_A = M_k/M_{ks}$).

2. The method of claim 1, wherein the input signal is a frequency shift keyed signal with a first carrier frequency equal to $\omega_A$ and at least a second carrier frequency equal to $\omega_B$.

3. The method of claim 2, wherein the second carrier frequency $\omega_B$ is one of the frequencies $\omega_1, \ldots, \omega_n$ in the discrete spectral representation, with corresponding magnitude $M_B$.

4. The method of claim 2, wherein the second carrier frequency $\omega_B$ is not an integer multiple of the first carrier frequency $\omega_A$.

5. The method of claim 1, wherein the input signal additionally includes an analog signal representing a value measured by at least one sensor.

6. The method of claim 1, wherein the input signal is chosen to be a field bus signal that conforms to a wired or wireless Highway Addressable Remote Transducer standard.

7. The method of claim 1, wherein the transform is chosen to produce a discrete spectral representation wherein the first bin frequency $\omega_1$ is zero and a second non-zero bin frequency and following non-zero bin frequencies $\omega_3, \ldots, \omega_n$ are integer multiples of the first non-zero bin frequency $\omega_2$.

8. The method of claim 7, wherein the a second carrier frequency $\omega_B$ is one of the frequencies $\omega_1, \ldots, \omega_n$ in the discrete spectral representation, with corresponding magnitude $M_B$, and
wherein the first non-zero bin frequency $\omega_2$ corresponds to the second carrier frequency $\omega_B$.

9. The method of claim 3, wherein the magnitude $M_k$ of the extraction bin, and/or the magnitude $M_B$ corresponding to the second carrier frequency $\omega B$, is determined individually from a set of input signal samples.

10. The method of claim 9, wherein the magnitude $M_B$ corresponding to the second carrier frequency $\omega_B$ is determined individually from the set of input signal samples.

11. The method of claim 9, wherein the magnitude $M_k$ of the extraction bin is determined individually from the set of input signal samples.

12. The method of claim 9, wherein the magnitude $M_k$ of the extraction bin, and the magnitude $M_B$ corresponding to the second carrier frequency $\omega_B$, are determined individually from the set of input signal samples.

13. The method of claim 9, wherein the magnitude $M_k$, and/or the magnitude $M_B$, is determined from the set of input signal samples using discrete Fourier transform and/or using the Goertzel algorithm.

14. The method of claim 1, wherein the magnitude $M_k$ of the extraction bin is augmented by a magnitude $M_M$ corresponding to a frequency $\omega_M$ that is a mirror frequency of the frequency $\omega_k$ of the extraction bin, about a frequency R/2.

15. A device for use on a field bus that is controlled and/or managed using a frequency shift key-encoded digital data stream sent over the field bus, wherein in said data stream, one bit value is encoded by a first carrier frequency $\omega_A$ and the other bit value is encoded by a second carrier frequency $\omega_B$, the device comprising:
a first unit configured to acquire a set of N digital samples of an input signal from the field bus at a sampling rate R, said device being configured to determine the magnitude $M_B$ that a frequency component with frequency $\omega_B$ has in a discrete spectral representation of an input signal including n bins with frequencies $\omega_1, \ldots, \omega_n$ and corresponding magnitudes $M_1, \ldots, M_n$, wherein one of the bin frequencies $\omega_1, \ldots, \omega_n$ corresponds to the second carrier frequency $\omega_B$ and the discrete spectral representation is derivable from the input signal using a transform, wherein the device is further configured to determine the magnitude $M_A$ that a frequency component with frequency $\omega_A$ has in the discrete spectral representation of the input signal, wherein the device is further configured to determine a magnitude $M_k$ of a bin frequency component $\omega_k \neq \omega_A$ with index $k \in [1, \ldots, n]$, and wherein the device is further configured to determine $M_A$ from $M_k$ in combination with an allocation factor that indicates a portion $M_{ks}$ generated from a reference sinusoidal signal with frequency $\omega_A$ and unity magnitude that is allocated to the bin with index k, when the transform is applied to the reference sinusoidal signal to generate a spectral representation out of the reference sinusoidal signal, the magnitude $M_A$ being equal to the magnitude of the extraction bin $M_k$ divided by the portion $M_{ks}$ of the sinusoidal signal with frequency $\omega_A$ ($M_A = M_k / M_{ks}$).

16. The device of claim 15, further comprising:
a second unit, configured to perform the transform on the reference sinusoidal signal with frequency $\omega_A$ in order to obtain $M_{ks}$, and/or to individually obtain $M_{ks}$ from a set of N digital samples of the sinusoidal signal.

17. The device of claim 15, further comprising:
a memory including a pre-stored value of $M_{ks}$.

18. The device of claim 17, wherein the memory further includes a lookup table with a plurality of pre-stored values of $M_{ks}$ for one or more different combinations of sampling rate R and number N of acquired digital samples.

* * * * *